(12) United States Patent  (10) Patent No.: US 11,010,598 B2
Uchida  (45) Date of Patent: May 18, 2021

(54) BIOMETRIC AUTHENTICATION DEVICE AND BIOMETRIC AUTHENTICATION METHOD

(71) Applicant: FUJITSU LIMITED, Kawasaki (JP)

(72) Inventor: Hidetsugu Uchida, Meguro (JP)

(73) Assignee: FUJITSU LIMITED, Kawasaki (JP)

( * ) Notice: Subject to any disclaimer, the term of this patent is extended or adjusted under 35 U.S.C. 154(b) by 104 days.

(21) Appl. No.: 16/412,485

(22) Filed: May 15, 2019

(65) Prior Publication Data

US 2019/0362136 A1 Nov. 28, 2019

(30) Foreign Application Priority Data

May 23, 2018 (JP) .............................. JP2018-099085

(51) Int. Cl.
*G06K 9/00* (2006.01)
*G06K 9/62* (2006.01)
*G06F 21/32* (2013.01)

(52) U.S. Cl.
CPC ......... *G06K 9/00288* (2013.01); *G06F 21/32* (2013.01); *G06K 9/00268* (2013.01);
(Continued)

(58) Field of Classification Search
CPC ........... G06K 9/00288; G06K 9/00268; G06K 9/6202; G06K 9/6212; G06K 9/6215;
(Continued)

(56) References Cited

U.S. PATENT DOCUMENTS 10,726,245 B2 * 7/2020 Wen ..................... G02B 5/208
2006/0204058 A1 * 9/2006 Kim .................... G06K 9/00288
382/118
(Continued)

FOREIGN PATENT DOCUMENTS

JP 2003-099780 4/2003
JP 2013-022813 2/2013
JP 2015-074219 4/2015

OTHER PUBLICATIONS

Alireza Dehghani et al., "Face Detection Speed Improvement using Bitmap-based Histogram of Oriented Gradients", 2017 International Conference on Systems, Signals and Image Processing (IWSSIP), IEEE, May 22, 2017, pp. 1-5, XP033112630.
(Continued)

*Primary Examiner* — Ming Y Hon
(74) *Attorney, Agent, or Firm* — Fujitsu Patent Center

(57) ABSTRACT

A biometric authentication device includes a memory and a processor configured to obtain a first biometric image of a target for authentication, identify a first feature quantity set including a first pixel feature quantity of the first biometric image and a first coordinate feature quantity of the first biometric image, perform calculation of a degree of similarity between a first person factor vector of the first biometric image and a second person factor vector of a template in accordance with the first feature quantity set, a pixel feature quantity of the template, and a coordinate feature quantity of the template, and perform an authentication process of the first biometric image in accordance with the calculated degree of similarity.

13 Claims, 5 Drawing Sheets

(52) U.S. Cl.
CPC ......... *G06K 9/6202* (2013.01); *G06K 9/6212* (2013.01); *G06K 9/6215* (2013.01)

(58) Field of Classification Search
CPC ............. G06K 9/4642; G06K 9/00281; G06K 9/4661; G06K 9/00255; G06K 9/00986; G06F 21/32
See application file for complete search history.

(56) References Cited

U.S. PATENT DOCUMENTS

| | | | | |
|---|---|---|---|---|
| 2007/0127785 | A1* | 6/2007 | Hiraizumi | G06K 9/00281 |
| | | | | 382/118 |
| 2011/0222743 | A1* | 9/2011 | Tanaka | G06K 9/00288 |
| | | | | 382/118 |
| 2012/0213490 | A1* | 8/2012 | Steiner | G06K 9/00268 |
| | | | | 386/241 |
| 2013/0063581 | A1* | 3/2013 | Komatsu | G06K 9/00288 |
| | | | | 348/77 |
| 2015/0007295 | A1 | 1/2015 | Hou et al. | |
| 2016/0180068 | A1* | 6/2016 | Das | G06F 21/316 |
| | | | | 726/7 |
| 2017/0019400 | A1* | 1/2017 | Drolshagen | H04W 12/06 |
| 2017/0206404 | A1 | 7/2017 | Saripalle et al. | |
| 2018/0052514 | A1* | 2/2018 | Liu | G06K 9/00597 |
| 2018/0165545 | A1* | 6/2018 | Matsunami | G06K 9/00926 |
| 2018/0260546 | A1* | 9/2018 | Iwata | G06K 9/00221 |
| 2019/0042866 | A1* | 2/2019 | Mostafa | G06F 21/32 |
| 2020/0062275 | A1* | 2/2020 | Higgins | G06K 9/00845 |

OTHER PUBLICATIONS

EESR—Extended European Search Report of European Patent Application No. 19173523.2 dated Oct. 11, 2019.
Simon J.D. Prince et al., "Probabilistic Linear Discriminant Analysis for Inferences About Identity", IEEE, 2007 (8 pages).

* cited by examiner

BIOMETRIC AUTHENTICATION DEVICE AND BIOMETRIC AUTHENTICATION METHOD

CROSS-REFERENCE TO RELATED APPLICATION

This application is based upon and claims the benefit of priority of the prior Japanese Patent Application No. 2018-99085, filed on May 23, 2018, the entire contents of which are incorporated herein by reference.

FIELD

The embodiments discussed herein are related to a biometric authentication technology.

BACKGROUND

Face authentication is performed by extracting a feature quantity from a face image of an individual, and checking the feature quantity against a template. Therefore, a check without an error is possible when the feature quantity obtained from the face image of the same person is identical at all times. However, in actuality, even in the case of a face image of the same person, a change occurs in the image due to variation in lighting at a time of photographing, an expression, or the like, and a change also occurs in the feature quantity extracted from the image. The change in the feature quantity due to the variation causes an authentication error. Accordingly, many technologies for reducing authentication errors due to variations are proposed. Japanese Laid-open Patent Publication No. 2003-99780, for example, discloses a related technology.

SUMMARY

According to an aspect of the embodiment, a biometric authentication device includes a memory and a processor configured to obtain a first biometric image of a target for authentication, identify a first feature quantity set including a first pixel feature quantity of the first biometric image and a first coordinate feature quantity of the first biometric image, perform calculation of a degree of similarity between a first person factor vector of the first biometric image and a second person factor vector of a template in accordance with the first feature quantity set, a pixel feature quantity of the template, and a coordinate feature quantity of the template, and perform an authentication process of the first biometric image in accordance with the calculated degree of similarity.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

It is need to define variations affecting authentication in advance, or evaluate an environment at a time of photographing a checking image. For example, advance knowledge of the variations is needed, and it is difficult to deal with unknown variations in an actual situation.

Embodiments of a biometric authentication device and the like disclosed in the present application will hereinafter be described in detail with reference to the drawings. It is to be noted that the disclosed technology is not limited by the present embodiments. In addition, embodiments to be illustrated in the following may be combined as appropriate within a scope where no inconsistency arises.

Figure 1:
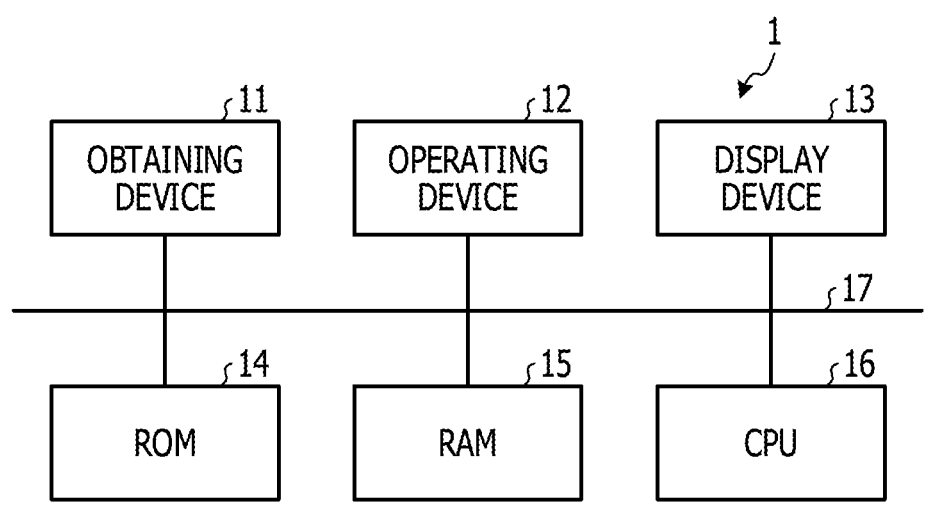
FIG. 1 is a block diagram illustrating an example of a hardware configuration of a biometric authentication device according to a present embodiment.

FIG. 1 is a block diagram illustrating an example of a hardware configuration of a biometric authentication device 1 according to a present embodiment. The biometric authentication device 1 illustrated in FIG. 1 includes an obtaining device 11, an operating device 12, a display device 13, a read only memory (ROM) 14, a random access memory (RAM) 15, a central processing unit (CPU) 16, and a bus 17. The obtaining device 11 is an imaging unit such as a camera, an infrared (IR) camera, a near infrared (NIR) camera, a Depth camera, a thermal camera, or the like, which obtains a biometric image of a person to be authenticated, for example, a face image of the person to be authenticated. The face image includes pixel information such as color information of RGB or the like, coordinate information, and the like. The operating device 12 is an input interface (IF) that inputs various kinds of information. The display device 13 is an output IF that performs display output of various kinds of information. The ROM 14 is, for example, an area that stores various kinds of information such as a program and the like. The RAM 15 is an area that stores various kinds of information. The CPU 16 controls the whole of the biometric authentication device 1. The bus 17 is a bus line that couples the obtaining device 11, the operating device 12, the display device 13, the ROM 14, the RAM 15, and the CPU 16 to one another.

Figure 2:
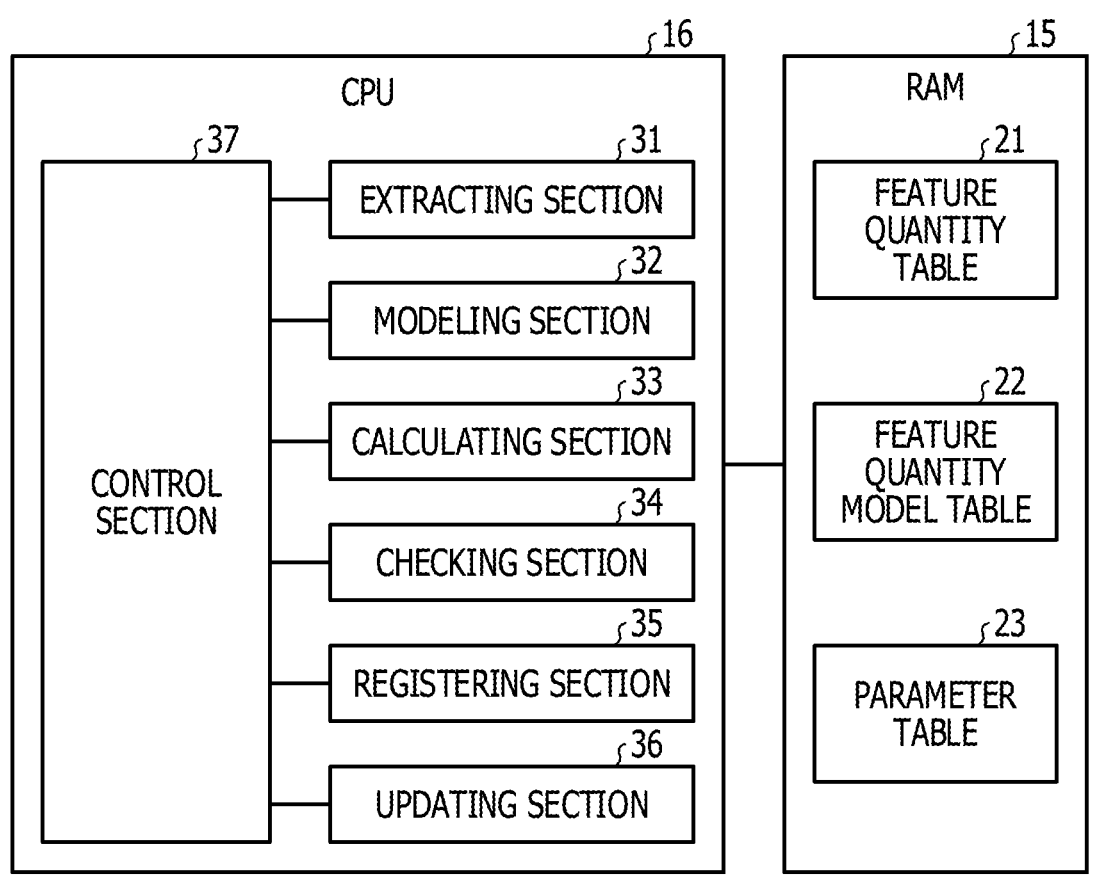
FIG. 2 is a block diagram illustrating an example of a functional configuration of a biometric authentication device.

FIG. 2 is a block diagram illustrating an example of a functional configuration of the biometric authentication device 1. The RAM 15 includes a feature quantity table 21, a feature quantity model table 22, and a parameter table 23. The feature quantity table 21 is an area that stores a feature quantity set of each face image, the feature quantity set being a pixel feature quantity and a coordinate feature quantity to be described later that are extracted from the face image or the like. The feature quantity model table 22 is an area that stores a first model for calculating the pixel feature quantity to be described later and a second model for calculating the coordinate feature quantity to be described later. The parameter table 23 is an area that stores parameters as coefficients of the first model and the second model.

The CPU 16, for example, expands a biometric authentication program stored in the ROM 14 into the RAM 15. Then, the CPU 16 executes the biometric authentication program expanded in the RAM 15 and including a plurality of instructions as a biometric authentication process. The CPU 16 thereby executes, for example, an extracting section 31, a modeling section 32, a calculating section 33, a checking section 34, a registering section 35, an updating section 36, and a control section 37 as functions.

The extracting section 31 extracts a pixel feature quantity and a coordinate feature quantity as a feature quantity set from one biometric image of the person to be authenticated, the biometric image being obtained from the obtaining device 11, for example, a plurality of face images of the person to be authenticated. Incidentally, the obtaining device 11, for example, obtains one face image from the person to be authenticated by one time of processing. The extracting section 31 extracts the feature quantity set of the pixel feature quantity and the coordinate feature quantity for each face image. The pixel feature quantity is information such as a histograms of oriented gradients (HOG) feature quantity obtained by converting the directions of gradients of luminance of pixels into a histogram or the like. The coordinate feature quantity is, for example, information on the coordinates of each pixel of the face image, the information indicating the position of a characteristic part such as the position of a mouth, the position of a corner of an eye, or the like. The pixel feature quantity and the coordinate feature quantity as the feature quantity set are information that may be extracted at the same time from the face images as the same biometric image and is needed for person identification.

The registering section 35 stores the feature quantity set of the pixel feature quantity and the coordinate feature quantity for each face image in the feature quantity table 21. The feature quantity table 21 associates the feature quantity sets of the face images with respective identifiers (IDs) identifying the face images, and stores the feature quantity sets as a template (data set for learning). Incidentally, a pixel feature quantity x and a coordinate feature quantity y may be expressed by a numerical value sequence (vector) as represented in (Expression 1).

$$ID1[x_1,x_2,x_3,x_4, \ldots x_{Dx}][y_1,y_2,y_3,y_4, \ldots y_{Dy}]$$

$$ID2[x_1,x_2,x_3,x_4, \ldots x_{Dx}][y_1,y_2,y_3,y_4, \ldots y_{Dy}]$$ [Expression 1]

In addition, in a case of feature quantity sets identifying persons, the feature quantity table 21 stores the feature quantity sets for respective IDs identifying the persons. The modeling section 32 models the pixel feature quantity and the coordinate feature quantity of each face image extracted in the extracting section 31 with a person factor vector and an environment factor vector as elements. The modeling section 32 estimates parameters of Gaussian distribution related to a pixel feature quantity and a coordinate feature quantity from a data set for learning. Incidentally, a data format within the data set for learning is identical to that of the pixel feature quantity and the coordinate feature quantity of each face image. The data set for learning is a pixel feature quantity $X_j^{(i)}$ and a coordinate feature quantity $Y_j^{(i)}$ obtained from a jth face image of an ith person. A vector of the pixel feature quantity $X_j^{(i)}$ obtained from the jth face image of the ith person is expressed by (Expression 2). Incidentally, $h^{(i)}$ is a vector representing a person factor, and follows a statistical Gaussian distribution. $z_j^{(i)}$ is a vector representing noise as a factor other than a person, for example, an environment factor, and follows a statistical Gaussian distribution. $\sigma_j^{(i)}$ is a vector representing a model error of the pixel feature quantity, and follows a statistical Gaussian distribution (for example, a Gaussian distribution with a variance σ). A, B, and $m_x$ are linear transformation coefficients of the person factor vector and the environment factor vector for the pixel feature quantity.

$$X_j^{(i)}=Ah^{(i)}+Bz_j^{(i)}+m_x+\sigma_j^{(i)}$$ [Expression 2]

A vector of the coordinate feature quantity $Y_j^{(i)}$ obtained from the jth face image of the ith person is expressed by (Expression 3). Incidentally, $Y_j^{(i)}$ is a vector representing a model error of the coordinate feature quantity, and follows a statistical Gaussian distribution (for example, a Gaussian distribution with a variance γ). C, D, and $m_y$ are linear transformation coefficients of the person factor vector and the environment factor vector for the coordinate feature quantity.

$$Y_j^{(i)}=Ch^{(i)}+Dz_j^{(i)}+m_y+\gamma_j^{(i)}$$ [Expression 3]

Under an assumption that in a case of an identical person, the person factor vector is an identical value between feature quantities, and the environment factor vector is different for each face image, the modeling section 32 estimates the values of model parameters (A, B, C, D, $m_x$, $m_y$, σ, and γ).

The calculating section 33 calculates a probability (degree of similarity) that the person factor vectors of the face image of the person to be authenticated and the face image of the template match each other based on the pixel feature quantity and the coordinate feature quantity extracted from the face image of the person to be authenticated and the pixel feature quantity and the coordinate feature quantity of the template. Incidentally, suppose that the pixel feature quantity of the person to be authenticated is $x^{(q)}$, that the coordinate feature quantity of the person to be authenticated is $y^{(q)}$, that the pixel feature quantity of the template of an arbitrary person is $x^{(t)}$, and that the coordinate feature quantity of the template of the arbitrary person is $y^{(t)}$. When the person to be authenticated and the template represent an identical person, the pixel feature quantity and the coordinate feature quantity of the person to be authenticated and the pixel feature quantity and the coordinate feature quantity of the template have an identical person factor vector h, and therefore a probability p may be expressed by (Expression 4) using the model parameters. Incidentally, N(x; m, v) of (Expression 4) denotes that x follows a normal distribution with an average vector m and a covariance matrix v. This normal distribution indicates a probability that $x^{(q)}$, $y^{(q)}$, $x^{(t)}$, and $y^{(t)}$ are observed at the same time under a condition that the feature quantity sets of the pixel feature quantities and the coordinate feature quantities have an identical person factor vector h. In addition, this distribution is calculated by erasing the person factor vector h and the environment factor vector z from the distribution of feature quantities by integration, and indicates the probability p that the person factor vectors h match each other in consideration of all variations in the person factor vectors h and the environment factor vectors z.

The checking section 34 determines whether or not the probability p that the person factor vectors match each other exceeds a first threshold value. When the probability p exceeds the first threshold value, the checking section 34 determines a success in checking. As a result, in the case of the success in the checking, the checking section 34 determines that the person to be authenticated and the template represent an identical person. The checking section 34 determines a failure in the checking when the probability p does not exceed the first threshold value. As a result, in the case of the failure in the checking, the checking section 34 determines that the person to be authenticated and the template do not represent an identical person.

$$p(x^{(q)}, y^{(q)}, x^{(t)}, y^{(t)}) = N\left(\begin{bmatrix} x^{(q)} \\ y^{(q)} \\ x^{(t)} \\ y^{(t)} \end{bmatrix}; \begin{bmatrix} m_x \\ m_y \\ m_x \\ m_y \end{bmatrix}, \right.$$ [Expression 4]

-continued $$\begin{bmatrix} \begin{bmatrix} A & B \\ C & D \end{bmatrix} \begin{bmatrix} A & B \\ C & D \end{bmatrix}' + \begin{matrix} \sigma & 0 \\ 0 & \lambda \end{matrix} & \begin{matrix} AA' & AC' \\ CA' & CC' \end{matrix} \\ \begin{matrix} AA' & AC' \\ CA' & CC' \end{matrix} & \begin{bmatrix} A & B \\ C & D \end{bmatrix} \begin{bmatrix} A & B \\ C & D \end{bmatrix}' + \begin{matrix} \sigma & 0 \\ 0 & \lambda \end{matrix} \end{bmatrix}$$

When the probability p exceeds a second threshold value, the updating section 36 estimates the model parameters using the pixel feature quantity and the coordinate feature quantity of the person to be authenticated, the pixel feature quantity and the coordinate feature quantity being related to the probability p, and updates existing model parameters now stored in the parameter table 23 with the estimated model parameters. Incidentally, the second threshold value is high for an identical person factor vector h, and is set higher than the first threshold value.

Figure 3:
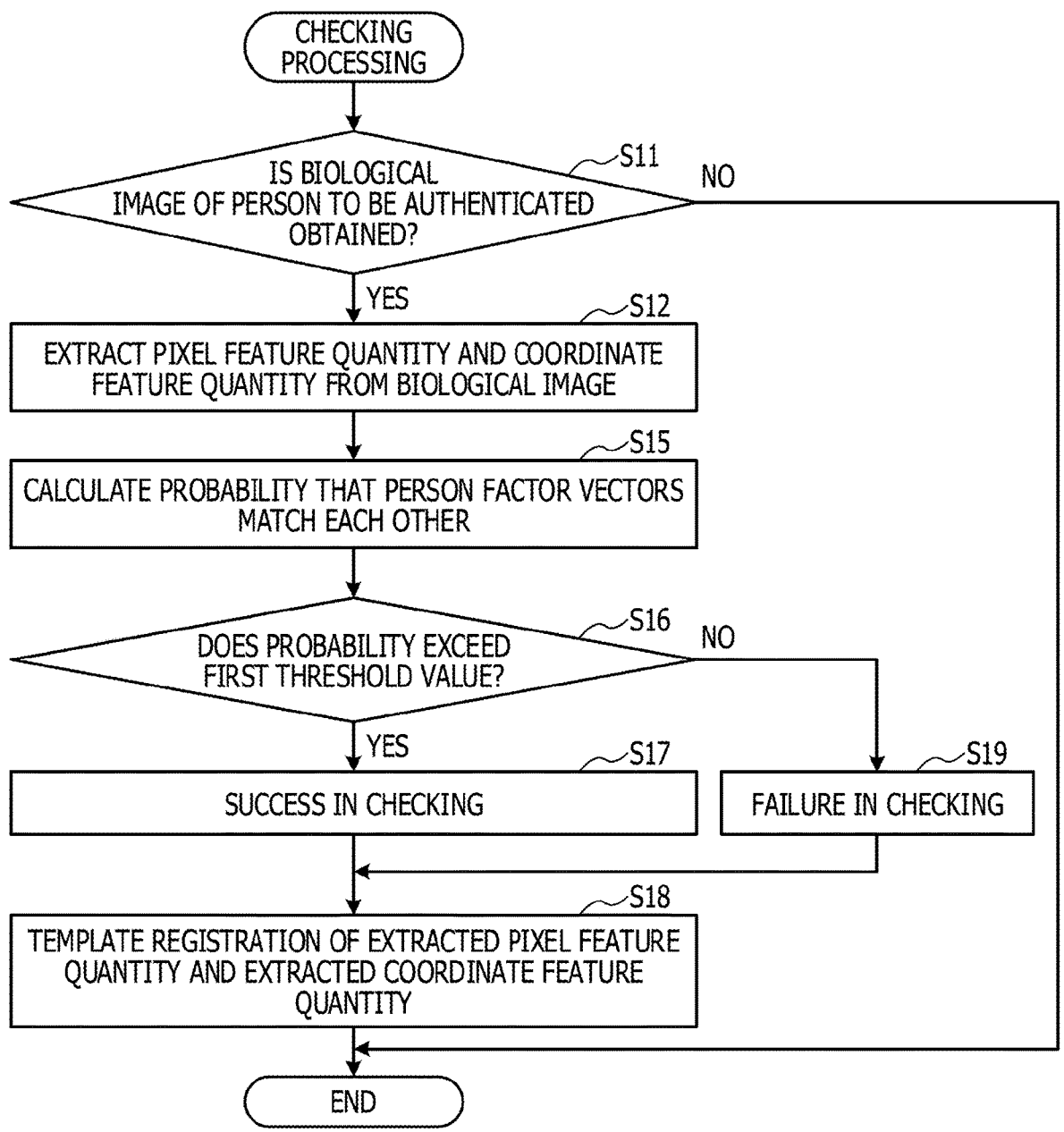
FIG. 3 is a flowchart illustrating an example of processing operation of a CPU in relation to checking processing.

Description will next be made of operation of the biometric authentication device 1 according to the present embodiment. FIG. 3 is a flowchart illustrating an example of processing operation of the CPU 16 in relation to checking processing. The checking processing illustrated in FIG. 3 is processing of checking the person factor vectors of the person to be authenticated and a template against each other based on the probability p calculated based on the pixel feature quantity and the coordinate feature quantity of the person to be authenticated and the pixel feature quantity and the coordinate feature quantity of the template.

The extracting section 31 within the CPU 16 determines whether or not a biometric image of a person to be authenticated is obtained (step S11). Incidentally, the biometric image is a face image of the person to be authenticated, the face image being obtained by the obtaining device 11. When the extracting section 31 obtains the biometric image of the person to be authenticated (affirmative in step S11), the extracting section 31 extracts a pixel feature quantity and a coordinate feature quantity from the biometric image (step S12).

The calculating section 33 within the CPU 16 calculates a probability that the person factor vectors of the person to be authenticated and a template already registered in the feature quantity table 21 match each other by using (Expression 4) based on the extracted pixel feature quantity and the extracted coordinate feature quantity of the person to be authenticated and the pixel feature quantity and the coordinate feature quantity of the template (step S15).

The checking section 34 within the CPU 16 determines whether or not the probability calculated in step S15 exceeds the first threshold value (step S16). When the calculated probability exceeds the first threshold value (affirmative in step S16), the checking section 34 determines a success in the checking of the person to be authenticated and the template against each other (step S17). As a result, the checking section 34 determines that the person to be authenticated and the template represent an identical person. After determining the success in the checking, the registering section 35 within the CPU 16 additionally registers the pixel feature quantity and the coordinate feature quantity of the person to be authenticated in the feature quantity table 21 (step S18). The registering section 35 then ends the processing operation illustrated in FIG. 3.

When the probability calculated in step S15 does not exceed the first threshold value (negative in step S16), the checking section 34 determines a failure in checking of the person to be authenticated and the template against each other (step S19). As a result, the checking section 34 determines that the person to be authenticated and the template do not represent an identical person. Then, after determining the failure in the checking, the registering section 35 proceeds to step S18 to register the pixel feature quantity and the coordinate feature quantity of the person to be authenticated in the feature quantity table 21. When the extracting section 31 does not obtain a biometric image of the person to be authenticated (negative in step S11), the extracting section 31 ends the processing operation illustrated in FIG. 3.

The CPU 16 performing the checking processing illustrated in FIG. 3 models the pixel feature quantity and the coordinate feature quantity extracted from the face image of the person to be authenticated with the person factor vector and the environment factor vector as elements, and estimates the model parameters based on the pixel feature quantity and the coordinate feature quantity. Using the estimated parameters, the CPU 16 calculates the probability that the person factor vectors match each other from correlation between the extracted pixel feature quantity and the extracted coordinate feature quantity of the person to be authenticated and the pixel feature quantity and the coordinate feature quantity of an arbitrary person within the template. Further, the CPU 16 determines that the person to be authenticated and the arbitrary person represent an identical person when the calculated probability exceeds the first threshold value. As a result, the person factor vector may be observed in one of the pixel feature quantities and the coordinate feature quantities.

Figure 4:
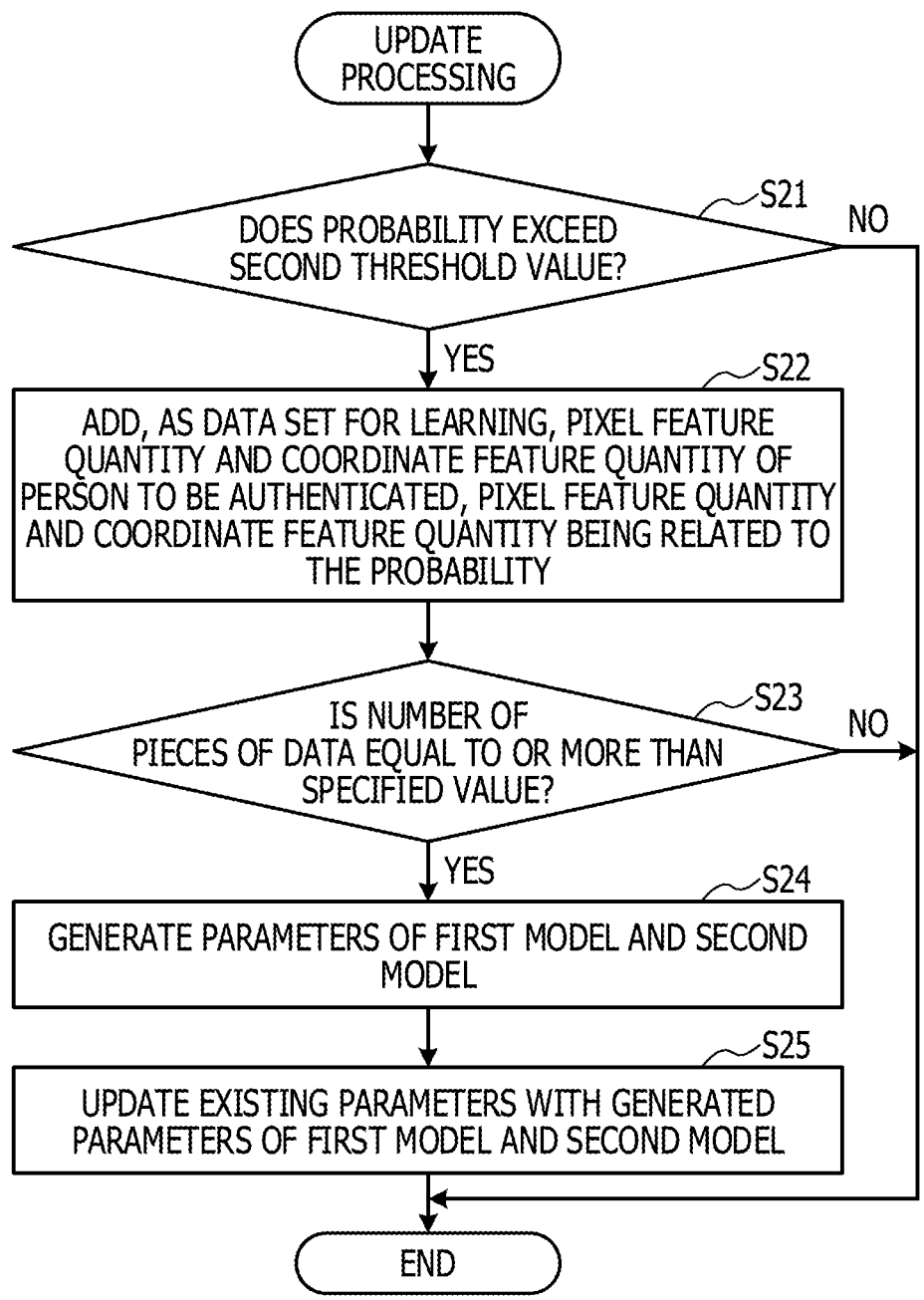
FIG. 4 is a flowchart illustrating an example of processing operation of a CPU in relation to update processing.

FIG. 4 is a flowchart illustrating an example of processing operation of the CPU 16 in relation to update processing. In FIG. 4, the updating section 36 within the CPU 16 determines whether or not the probability that the person factor vectors of the person to be authenticated and the template match each other exceeds the second threshold value (step S21). When the probability that the person factor vectors of the person to be authenticated and the template match each other exceeds the second threshold value (affirmative in step S21), the updating section 36 additionally registers the extracted pixel feature quantity and the extracted coordinate feature quantity of the person to be authenticated as a data set for learning (step S22).

The updating section 36 determines whether or not the number of pieces of data as data sets for learning is equal to or more than a specified value (step S23). When the number of pieces of data as data sets for learning is equal to or more than the specified value (affirmative in step S23), the updating section 36 generates the parameters of the first model and the second model based on the data sets for learning whose number is equal to or more than the specified value (step S24). The updating section 36 updates existing parameters now stored in the parameter table 23 with the generated parameters (step S25). The updating section 36 then ends the processing operation illustrated in FIG. 4.

When the probability that the person factor vectors match each other does not exceed the second threshold value (negative in step S21), the updating section 36 ends the processing operation illustrated in FIG. 4. When the number of pieces of data as data sets for learning is not equal to or more than the specified value (negative in step S23), the updating section 36 ends the processing operation illustrated in FIG. 4.

When the probability that the person factor vectors match each other exceeds the second threshold value, the CPU 16 performing the update processing illustrated in FIG. 4 adds, as a data set for learning, the pixel feature quantity and the coordinate feature quantity of the person to be authenticated, the pixel feature quantity and the coordinate feature quantity being related to the probability. Further, when the number of pieces of data is equal to or more than the specified value, the CPU 16 estimates the parameters of the first model and the second model based on the data sets for learning whose number is equal to or more than the specified value, and updates the parameter table 23 with the estimated parameters. As a result, it is possible to set model parameters reflecting the pixel feature quantity and the coordinate feature quantity during operation.

The biometric authentication device 1 according to the first embodiment models the person factor vector and the environment factor vector at the same time for a plurality of feature quantities. Thus, even when it is difficult to observe the person factor vector sufficiently from a single feature quantity, the person factor vector may be observed from another feature quantity. For example, in face authentication, modeling the pixel feature quantity and the coordinate feature quantity at the same time enables the person factor vector to be observed from the coordinate feature quantity even when it is difficult to observe the person factor vector from the pixel feature quantity due to variations that greatly affect pixels, the variations being lighting variations or the like. In addition, even when it is difficult to observe the person factor vector from the coordinate feature quantity, the person factor vector may be observed from the pixel feature quantity. As a result, various variations may be taken into consideration by not explicitly assuming kinds and characteristics of the variations affecting authentication. Furthermore, authentication under the various variations may be made robust by modeling the person factor vector and the environment factor vector using the plurality of feature quantities. Biometric authentication may be realized while the effects of the variations are reduced.

The modeling section 32 sets, as variables, the person factor vector and the environment factor vector common to the feature quantities, expresses the person factor vector and the environment factor vector by linear transformation having different coefficients, and models the pixel feature quantity and the coordinate feature quantity extracted from the face image by statistical Gaussian distribution. The calculating section 33 calculates the probability that the person factor vectors of the feature quantity set obtained from the person to be authenticated and the feature quantity set of the template match each other using the model parameters estimated by the modeling section 32. As a result, even when it is difficult to observe the person factor vector sufficiently from a single feature quantity, the person factor vector may be observed from another feature quantity.

The biometric authentication device 1 extracts the pixel feature quantity and the coordinate feature quantity from a plurality of biometric images of the target to be authenticated, models the pixel feature quantity and the coordinate feature quantity with the person factor vector and the environment factor vector as elements, and estimates the model parameters based on the pixel feature quantity and the coordinate feature quantity. Further, using the estimated model parameters, the biometric authentication device 1 calculates the probability of the person factor vector from correlation between the extracted pixel feature quantity and the extracted coordinate feature quantity of the target to be authenticated and the pixel feature quantity and the coordinate feature quantity within the template. Further, the biometric authentication device 1 checks the person factor vectors of the target to be authenticated and the template against each other based on the probability. As a result, even when it is difficult to observe the person factor vector sufficiently from a single feature quantity, the person factor vector may be observed from another feature quantity.

The biometric authentication device 1 additionally registers the extracted pixel feature quantity and the extracted coordinate feature quantity as the pixel feature quantity and the coordinate feature quantity of a template. As a result, because the pixel feature quantity and the coordinate feature quantity are additionally registered as a data set for learning, it is possible to calculate a highly accurate probability reflecting operation conditions.

The biometric authentication device 1 sets, as variables, the person factor vector and the environment factor vector common between the extracted pixel feature quantity and the extracted coordinate feature quantity, expresses the person factor vector and the environment factor vector by linear transformation with different coefficients, and models the pixel feature quantity and the coordinate feature quantity by statistical Gaussian distribution.

Using the estimated model parameters, the biometric authentication device 1 calculates the probability that the person factor vectors of the pixel feature quantity and the coordinate feature quantity extracted from the biometric image of the target to be authenticated and the pixel feature quantity and the coordinate feature quantity of the template match each other. The biometric authentication device 1 determines a success in checking when the probability exceeds the first threshold value, and determines a failure in the checking when the probability does not exceed the first threshold value. As a result, the person may be checked with the probability that the person factor vectors match each other.

The feature quantity set extracted from the person to be authenticated during operation is reused as a data set for learning, the parameters of the first model and the second model are estimated based on the data set for learning during operation, and the estimated parameters are updated. As a result, model parameters reflecting conditions during operation are secured. When the probability that the person factor vectors of the feature quantity set extracted from the person to be authenticated during operation and the feature quantity set of the template match each other exceeds the second threshold value, the feature quantity set of the target to be authenticated is associated with the ID of the registrant, and added as a data set for learning. Further, at this time, when learning data newly obtained during operation exceeds a specified number of pieces of data, the model parameters are estimated again by using the new data, and are updated.

It is each need to define variations affecting authentication in advance, or evaluate an environment at a time of photographing a checking image. For example, advance knowledge of the variations is needed, and it is difficult to deal with unknown variations. Further, in a case where a single feature quantity is used, all variations are modeled as changes in the feature quantity, and therefore it is difficult to achieve the modeling sufficiently depending on the characteristics of the variations. On the other hand, the present embodiment does not necessitate advance knowledge of the variations affecting authentication, but may perform authentication robust against various unknown variations not defined in advance.

Incidentally, while the biometric authentication device 1 includes the obtaining device 11 that obtains a biometric image from a target to be authenticated, the biometric authentication device 1 may obtain a biometric image from an obtaining device 11 as an external device. Changes may be thus made as appropriate.

While a case has been illustrated in which the biometric authentication device 1 extracts the pixel feature quantity and the coordinate feature quantity from a face image, the biometric authentication device 1 may extract another feature quantity of characteristics different from the pixel feature quantity and the coordinate feature quantity, the other feature quantity being able to be extracted from the single biometric image at the same time, in addition to the pixel feature quantity and the coordinate feature quantity. Changes may be thus made as appropriate. In this case, the biometric authentication device 1 models the pixel feature quantity, the coordinate feature quantity, and the other feature quantity with the person factor vector and the environment factor vector as elements. Further, the biometric authentication device 1 calculates the probability that the person factor vectors match each other from correlation between the pixel feature quantity, the coordinate feature quantity, and the other feature quantity of the person to be authenticated and the pixel feature quantity, the coordinate feature quantity, and the other feature quantity within a template. As a result, the probability that the person factor vectors match each other may be calculated with high accuracy by adding the other feature quantity to the pixel feature quantity and the coordinate feature quantity.

The biometric authentication device 1 obtains a face image illustrated as a biometric image. However, the biometric image may be a face image, and besides, may be, for example, a finger image, a hand image, or the like. Changes may be thus made as appropriate.

The biometric authentication device 1 determines a success in checking when the probability that the person factor vectors of the person to be authenticated and the template match each other exceeds the first threshold value, and determines a failure in the checking when the probability does not exceed the first threshold value. However, the biometric authentication device 1 may determine the failure in the checking when the probability that the person factor vectors of the person to be authenticated and the template do not match each other exceeds the first threshold value, and determine the success in the checking when the probability does not exceed the first threshold value. Changes may be thus made as appropriate. As a result, the person may be checked with the probability that the person factor vectors do not match each other.

In addition, each constituent element of each unit illustrated in the figures may not need to be physically configured as illustrated in the figures. For example, concrete forms of distribution and integration of each unit may be those illustrated in the figures, and besides, the whole or a part of each unit may be configured so as to be distributed and integrated functionally or physically in arbitrary units according to various kinds of loads, usage conditions, or the like.

Further, the whole or an arbitrary part of various kinds of processing functions performed by each device may be performed on a central processing unit (CPU) (or a microcomputer such as a micro processing unit (MPU), a micro controller unit (MCU), or the like). In addition, it is needless to say that the whole or an arbitrary part of the various kinds of processing functions may be performed on a program analyzed and executed by a CPU (or a microcomputer such as an MPU, an MCU, or the like) or on hardware based on wired logic.

Figure 5:
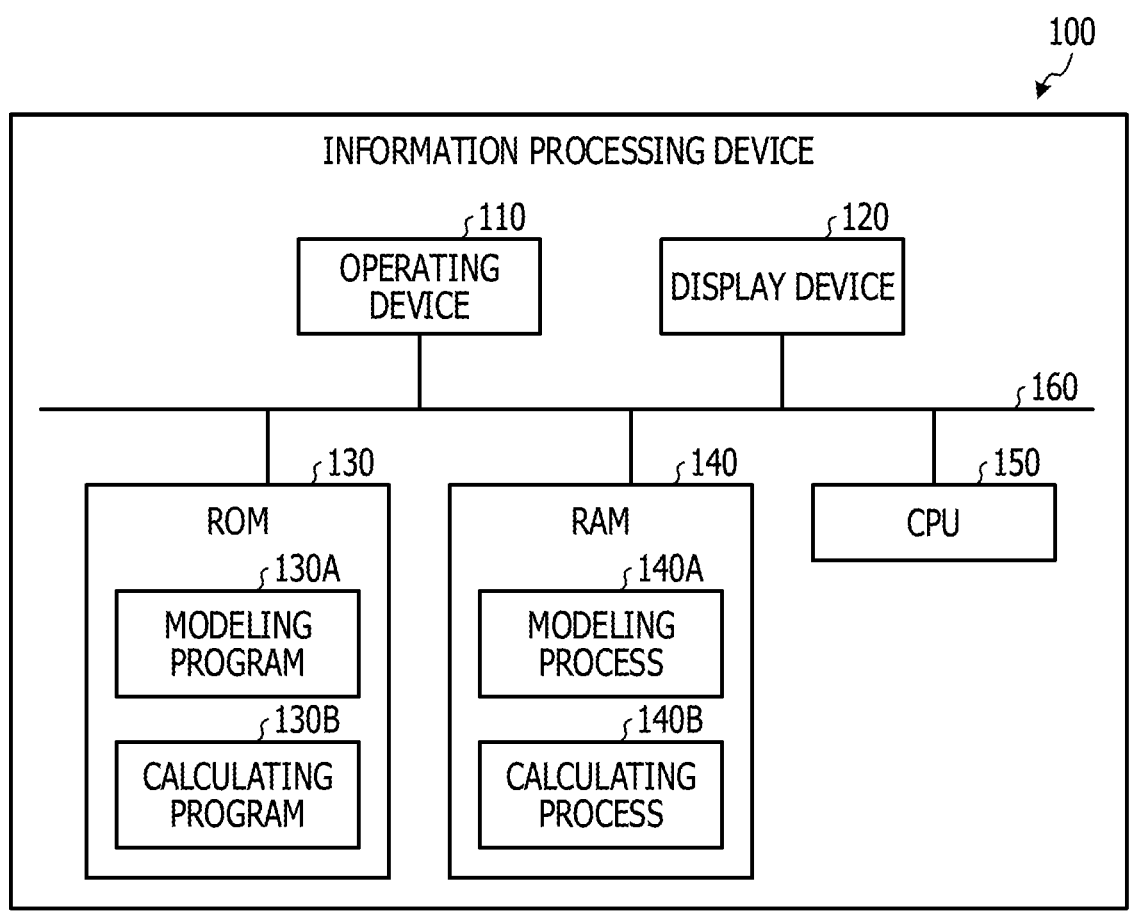
FIG. 5 is a diagram of assistance in explaining an example of an information processing device that executes a biometric authentication program.

The various kinds of processing described in the present embodiment may be implemented by executing a program prepared in advance on an information processing device. Accordingly, in the following, description will be made of an example of an information processing device that executes a program having functions similar to those of the foregoing embodiment. FIG. 5 is a diagram of assistance in explaining an example of an information processing device 100 that executes a biometric authentication program.

The information processing device 100 illustrated in FIG. 5, the information processing device 100 executing the biometric authentication program, includes an operating device 110, a display device 120, a ROM 130, a RAM 140, a CPU 150, and a bus 160.

The biometric authentication program that exerts the functions similar to those of the foregoing embodiment is stored in the ROM 130 in advance. Incidentally, the biometric authentication program may be recorded on a recording medium that may be read by a drive not illustrated, rather than the ROM 130. In addition, the recording medium may be a portable recording medium such as a compact disc (CD)-ROM, a digital versatile disc (DVD) disk, a universal serial bus (USB) memory, a secure digital (SD) card, or the like, or a semiconductor memory such as a flash memory or the like. The biometric authentication program is a modeling program 130A and a calculating program 130B, as illustrated in FIG. 5. Incidentally, the programs 130A and 130B may be integrated or distributed as appropriate.

The CPU 150 reads these programs 130A and 130B from the ROM 130, and expands each of these read programs in a work area of the RAM 140. Then, the CPU 150 makes the programs 130A and 130B expanded in the RAM 140 function as a modeling process 140A and a calculating process 140B, as illustrated in FIG. 5. The pixel feature quantity and the coordinate feature quantity of the template are registered in the RAM 140.

The CPU 150 generates a model of each of pixel feature quantities and coordinate feature quantities extracted from a plurality of biometric images with the person factor vector and the environment factor vector based on an assumption as elements. Further, the CPU 150 estimates the model parameters of the model based on the pixel feature quantities and the coordinate feature quantities. The CPU 150 calculates similarity of the person factor vector between the target to be authenticated and the template based on the model parameters, the pixel feature quantities and the coordinate feature quantities extracted from the biometric images of the target to be authenticated, and the pixel feature quantity and the coordinate feature quantity stored after being generated in advance based on a biometric image that may be checked against the target to be authenticated. As a result, biometric authentication may be realized while the effects of variations are reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A biometric authentication device comprising:
a memory; and
a processor coupled to the memory and the processor configured to:
obtain a first biometric image of a target for authentication;
identify a first feature quantity set including a first pixel feature quantity of the first biometric image and a first coordinate feature quantity of the first biometric image;
perform calculation of a degree of similarity between a first person factor vector of the first biometric image and a second person factor vector of a template in accordance with the first feature quantity set, a pixel feature quantity of the template, and a coordinate feature quantity of the template; and
perform an authentication process of the first biometric image in accordance with the calculated degree of similarity,
wherein the degree of similarity corresponds to a probability that the first person factor vector of the first biometric image and the second person factor vector of the template match each other,
the authentication process is a process of determining that authentication of the target is successful when the probability exceeds a first threshold value,
the calculation is performed by using a parameter, and
the processor is configured to update the parameter in accordance with the first pixel feature quantity and the first coordinate feature quantity of the first biometric image when the probability exceeds a second threshold value higher than the first threshold value.

2. The biometric authentication device according to claim 1, wherein
the calculation is performed by using a parameter, and
the parameter is calculated, by modeling a pixel feature quantity and a coordinate feature quantity of each of a plurality of biometric images into a model including a person factor vector and an environment factor vector, under a condition that person factor vectors of pixel feature quantities and coordinate feature quantities of biometric images of an identical person are identical to each other and environment factor vectors of the pixel feature quantities and the coordinate feature quantities of the biometric images of the identical person are different from each other.

3. The biometric authentication device according to claim 2, wherein
the modeling includes
expressing each person factor vector and each environment factor vector common between the pixel feature quantity and the coordinate feature quantity of each of the plurality of biometric images by linear transformation with respective different coefficients, and
modeling the expressed pixel feature quantity and the expressed coordinate feature quantity by statistical distribution.

4. The biometric authentication device according to claim 3, wherein
the statistical distribution is a Gaussian distribution.

5. The biometric authentication device according to claim 1, wherein
the processor is configured to store the first feature quantity set as the template in the memory.

6. The biometric authentication device according to claim 1, wherein
the processor is configured to identify another feature quantity from the first biometric image, and
the degree of similarity is calculated based on the other feature quantity and another feature quantity of the template.

7. A computer-implemented biometric authentication method comprising:
obtaining a first biometric image of a target for authentication;
identifying a first feature quantity set including a first pixel feature quantity of the first biometric image and a first coordinate feature quantity of the first biometric image;
calculating a degree of similarity between a first person factor vector of the first biometric image and a second person factor vector of a template in accordance with the first feature quantity set, a pixel feature quantity of the template, and a coordinate feature quantity of the template; and
performing an authentication process of the first biometric image in accordance with the calculated degree of similarity,
wherein the degree of similarity corresponds to a probability that the first person factor vector of the first biometric image and the second person factor vector of the template match each other,
the authentication process is a process of determining that authentication of the target is successful when the probability exceeds a first threshold value,
the calculating of the degree of similarity is performed by using a parameter, and
the method further comprises updating the parameter in accordance with the first pixel feature quantity and the first coordinate feature quantity of the first biometric image when the probability exceeds a second threshold value higher than the first threshold value.

8. The biometric authentication method according to claim 7, wherein
the calculating is performed by using a parameter, and
the parameter is calculated, by modeling a pixel feature quantity and a coordinate feature quantity of each of a plurality of biometric images into a model including a person factor vector and an environment factor vector, under a condition that person factor vectors of pixel feature quantities and coordinate feature quantities of biometric images of an identical person are identical to each other and environment factor vectors of the pixel feature quantities and the coordinate feature quantities of the biometric images of the identical person are different from each other.

9. The biometric authentication method according to claim 8, wherein
the modeling includes
expressing each person factor vector and each environment factor vector common between the pixel feature quantity and the coordinate feature quantity of each of the plurality of biometric images by linear transformation with respective different coefficients, and
modeling the expressed pixel feature quantity and the expressed coordinate feature quantity by statistical distribution.

10. The biometric authentication method according to claim 9, wherein
the statistical distribution is a Gaussian distribution.

11. The biometric authentication method according to claim 7, further comprising: storing the first feature quantity set as the template in the memory.

12. The biometric authentication method according to claim 7, further comprising: identifying another feature quantity from the first biometric image,
wherein the degree of similarity is calculated based on the other feature quantity and another feature quantity of the template.

13. A non-transitory computer-readable medium storing biometric authentication program instructions executable by one or more computers, the biometric authentication program instructions comprising:
one or more instructions for obtaining a first biometric image of a target for authentication;
one or more instructions for identifying a first feature quantity set including a first pixel feature quantity of the first biometric image and a first coordinate feature quantity of the first biometric image;
one or more instructions for calculating a degree of similarity between a first person factor vector of the first biometric image and a second person factor vector of a template in accordance with the first feature quantity set, a pixel feature quantity of the template, and a coordinate feature quantity of the template; and
one or more instructions for performing an authentication process of the first biometric image in accordance with the calculated degree of similarity,
wherein the degree of similarity corresponds to a probability that the first person factor vector of the first biometric image and the second person factor vector of the template match each other,
the authentication process is a process of determining that authentication of the target is successful when the probability exceeds a first threshold value,
the calculating of the degree of similarity is performed by using a parameter, and
the method further comprises updating the parameter in accordance with the first pixel feature quantity and the first coordinate feature quantity of the first biometric image when the probability exceeds a second threshold value higher than the first threshold value.

* * * * *